United States Patent [19]
Larson et al.

[11] Patent Number: 5,681,091
[45] Date of Patent: Oct. 28, 1997

[54] AIRCRAFT SEAT PAN ASSEMBLY

[75] Inventors: Mark Larson, Pembroke Pines; Michael Oleson, Ft. Lauderdale, both of Fla.

[73] Assignee: Aircraft Modular Products, Inc., Miami, Fla.

[21] Appl. No.: 490,796

[22] Filed: Jun. 15, 1995

[51] Int. Cl.$^6$ ........................................ A47C 7/02
[52] U.S. Cl. ........................... 297/452.21; 297/452.1
[58] Field of Search ................... 297/452.21, 452.23, 297/452.34, 452.24, 452.1, 452.18, 452.55, 284.1, 284.3; 244/122 R

[56] References Cited

U.S. PATENT DOCUMENTS

| | | | |
|---|---|---|---|
| 2,637,368 | 5/1953 | Cotton | 244/122 R |
| 3,198,578 | 8/1965 | Geoffrey et al. | 297/452.57 |
| 4,509,796 | 4/1985 | Takagi | 297/452.55 |
| 4,526,421 | 7/1985 | Brennan et al. | 297/452.21 X |
| 4,630,864 | 12/1986 | Toll | 297/452.21 X |
| 4,702,522 | 10/1987 | Vail et al. | 297/452.57 X |
| 4,790,496 | 12/1988 | Marrujo | 244/122 R |
| 4,883,320 | 11/1989 | Izumida et al. | 297/452.23 X |
| 5,022,709 | 6/1991 | Marchino | 297/452.24 |
| 5,464,273 | 11/1995 | Makoto | 297/452.55 X |

FOREIGN PATENT DOCUMENTS

| | | | |
|---|---|---|---|
| 3643174 | 6/1988 | Germany | 297/284.1 |
| 642029 | 7/1962 | Italy | 297/284.1 |

Primary Examiner—Milton Nelson, Jr.
Attorney, Agent, or Firm—Malloy & Malloy, P.A.

[57] ABSTRACT

An aircraft seat pan assembly to be mounted on an aircraft seat foundation including a pair of spaced side rail supports and a pair of spaced apart cross supports disposed in spanning relating between the side rail supports, the seat pan assembly including a seat panel with a primary surface, a pair of opposite side edges, a front edge, and a rear edge. The side edges and front edge of the seat panel are structured to be secured directly to the side rail supports and a front cross support of the seat foundation in generally planar relation thereto, and a rear edge of the seat panel is structured to be secured to the rear cross support in a generally elevated, spaced apart position there above such that a quantity of a downward spine load exerted on the seat panel will be absorbed at the connection between the rear edge and the rear cross support. Accordingly, the panel will resist the downward spine load thereon to a satisfaction of FAA guidelines with a minimum initial stroking distance between the primary surface of the seat panel and any underlying seat frame portions being maintained.

5 Claims, 1 Drawing Sheet

U.S. Patent     Oct. 28, 1997     5,681,091
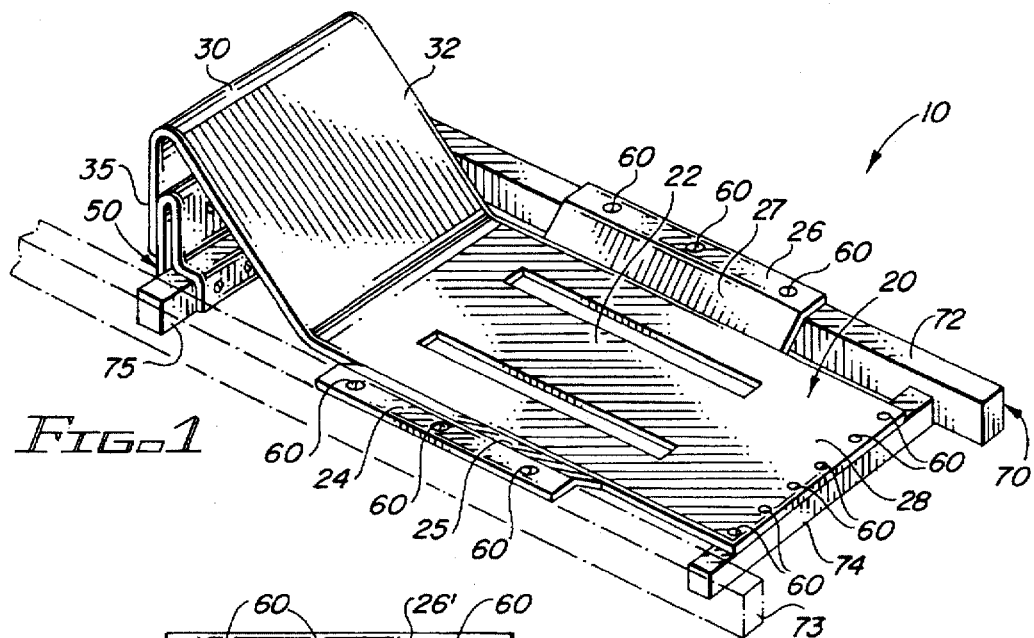
FIG. 1
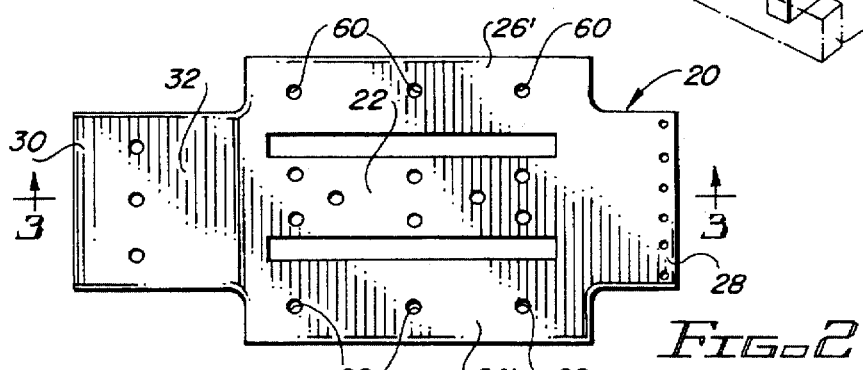
FIG. 2
FIG. 3
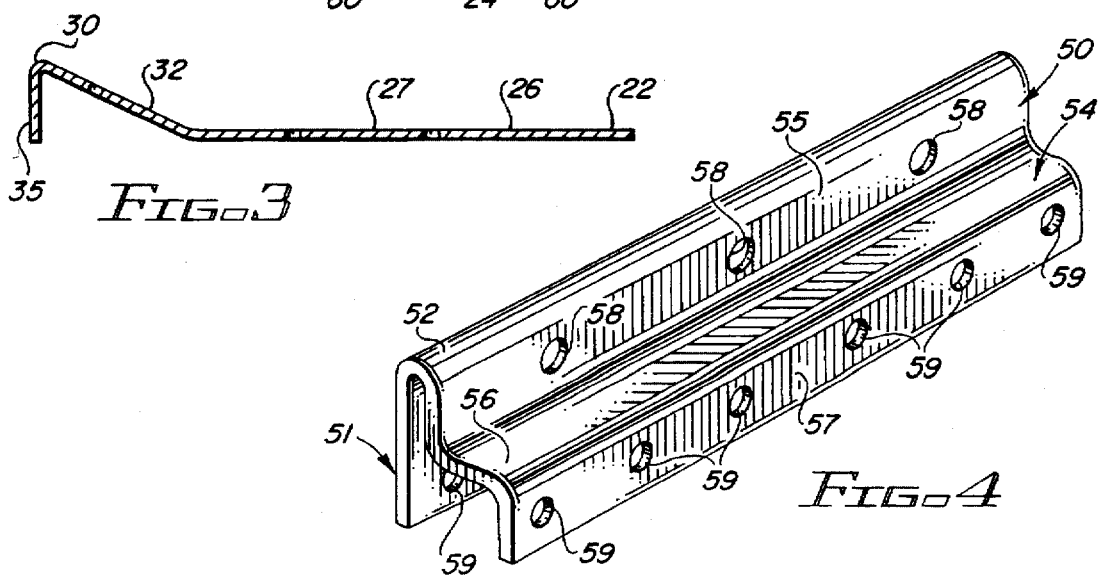
FIG. 4

AIRCRAFT SEAT PAN ASSEMBLY

BACKGROUND OF THE INVENTION

1. Field of the Invention

The present invention relates to an aircraft seat pan assembly structured to be mounted on an aircraft seat foundation, the seat pan assembly being structured to provide for a minimal stroking distance between the seat pan and any underlying seat frame portion while still appropriately withstanding a maximum downward spine load as determined by Federal Aviation Association (FAA) guidelines.

2. Description of the Related Art

In an aircraft seat frame, and particular in an aircraft seat foundation, the seat pan is the portion of the seat foundation which spans the supports of the seat foundation and actually supports the weight of a seated individual. Most conventionally implemented seat pan designs incorporate nylon or other material panels or meshes which are secured along all sides thereof to the cross supports and side rails of the seat foundation. Further, in addition to supporting an individual sitting on the seat foundation, the seat pan also functions to conceal a variety of underlying seat frame portions, such as recline mechanisms, swivel mechanisms, and various other articles associated with the aircraft seat and aircraft seat frame, thereunder.

The distance between the seat pan and the underlying seat portions concealed thereunder is generally called the stroking distance. Under normal loads, and under test loads, however, the seat pan will tend to sag downwardly, thereby reducing the stroking distance. During FAA testing procedures, the most recent increases of which are now having a practical impact on the related industry, a downward spine load of a predetermined intensity is exerted on the seat pan. The primary criterion observed in order to determine whether the seat pan assembly passes the downward spine load test relate to the seat pan remaining securely attached to the seat foundation and to the seat pan not sagging or stroking so far as to contact the underlying portions of the aircraft seat; although it will be understood that in some instances, the seat pan may contact the underlying portions of the aircraft seat so long as the lumbar load is below the fixed FAA requirements. With regard to maintaining the seat pan securely fastened to the seat foundation, this is conventionally achieved through secure bolts and by the strength of the material construction of the seat pan. Unfortunately, however, because of the needs to maintain maximum lightweight construction, and because of the flexing that is generally necessary in the seat pan for a comfortable seat assembly, the initial stroking distance of the seat pan must generally be quite large due to the amount of sagging which the seat pan will undertake upon the intense downward spine load. As such, there is a substantial amount of wasted space between the seat pan and the underlying portions.

As previously stated, the latest series of regulation increases set forth by the FAA are now impacting the aircraft seat manufacturing industry. Presently in the related art, the difficulties involved with providing an acceptable stroking distance to prevent contact by the seat pan under a load with the underlying seat portions has been achieved by increasing the initial stroking distance to permit the increased sag associated with the more stringent FAA test requirements. Such procedures, however, are inefficient and do not seek to provide a real solution to the problem. Rather present approaches only provide a coarse, jerry-rigged remedy that can lead to other problems such as the need to add material, and therefore weight, the need to elevate the seat foundation to un-practical levels, or the need to cut out or lower some underlying seat portions such as swivel or slider mechanisms. Accordingly, there is still a substantial need in this specialized and related art to provide for an improved aircraft seat pan assembly which provides for a minimal initial stroking distance, yet is capable of withstanding the downward spine load associated with FAA testing guidelines.

SUMMARY OF THE INVENTION

The present invention is directed towards an aircraft seat pan assembly to be mounted on an aircraft passenger seat foundation. The aircraft foundation is the portion of the seat upon which a user actually sits, and generally includes a pair of spaced side rail supports and a pair of spaced apart cross supports disposed in spanning relation between the side rail supports.

Included in the aircraft seat pan assembly is a seat panel. The seat panel has a primary surface, a pair of opposite side edges, a rear edge, and a front edge. Specifically, the side edges are structured and disposed to be directly secured to an upper surface of the side rail supports, in generally planar relation thereto. Similarly, the front edge of the seat panel is structured to be directly secured to a front one of the cross supports, in generally planar relation thereto.

Turning to the rear edge of the seat panel, it is structured to be secured to a rear one of the cross supports by rear fastening means. In particular, the rear fastening means are structured and disposed to secure the rear edge of the seat panel to the rear cross support in a generally elevated, spaced apart position above the rear cross support. Further, the rear fastening means are structured to absorb a quantity of the downward spine load exerted on the seat panel, such that the seat panel will be capable of resisting the downward spine load exerted thereon to a satisfaction of the FAA guidelines. Additionally, the rear fastening means permit the seat panel to resist the downward spine load with a minimal initial stroking distance between the primary surface of the seat panel and any underlying seat frame portions.

It is an object of the present invention to provide an aircraft seat panel assembly structured to withstand a downward spine load exerted thereon without contacting underlying seat portions.

Still another object of the present invention is to provide an aircraft seat pan assembly which has a minimal initial stroking distance, yet which is capable of withstanding a downward spine load as set by increased FAA test guidelines without contacting any underlying seat portions.

Also an object of the present invention is to provide an aircraft seat pan assembly which solves the recently evident problem of passing the FAA downward spine load test in an efficient and effective manner that does not merely require elevation of a seat foundation portion and therefore the addition of more materials and more weight to the overall seat assembly.

BRIEF DESCRIPTION OF THE DRAWINGS

For a fuller understanding of the nature of the present invention, reference should be had to the following detailed description taken in connection with the accompanying drawings in which:

FIG. 1 is a perspective view of the aircraft seat pan assembly of the present invention;

FIG. 2 is a top plan view of an alternative embodiment of the seat panel of the aircraft seat pan assembly of the present invention;

FIG. 3 is a cross-sectional view along line 3—3 of FIG.

FIG. 4 is an isolated perspective view of the preferred fastener clip of the aircraft seat pan assembly of the present invention.

Like reference numerals refer to like parts throughout the several views of the drawings.

DETAILED DESCRIPTION OF THE PREFERRED EMBODIMENT

Shown throughout the drawings, the present invention is directed towards an aircraft seat pan assembly, generally indicated as 10. In particular, the aircraft seat pan assembly 10 is structured to be secured atop an aircraft seat foundation, shown in part and generally indicated as 70. The seat foundation 70 is customarily of the type including a pair of spaced side rail supports 72 and 73 and a pair of cross supports 74 and 75 disposed in spanning relation between the side rail supports 72 and 73. As such, the seat foundation 70 makes up a primary component of the structural frame of the aircraft seat.

As with many conventional seat pan assemblies, the aircraft seat pan assembly 10 of the present invention is structured to be disposed atop the seat foundation 70 not only to support an individual thereon, but also to conceal a number of aircraft seat articles therebeneath. In particular, and especially when constructing custom aircraft seating for private and or luxury aircraft, the aircraft seats will include a variety of other mechanisms, such as a swivel mechanism, and/or guide rails for sliding, which make up the overall aircraft seat. These various aircraft seat components as well as other more conventionally known components such as wiring, footrests, recline cylinders and/or safety articles are generally included and concealed beneath the seat pan. Accordingly, when structuring and configuring the seat pan assembly, there are two primary considerations, in addition to the normal considerations associated with aircraft seating such as strength and lightweight construction. These additional considerations include the need to maintain the seat pan assembly from contacting the underlying items during a spine load test, and a desire to maintain an initial minimal stroking distance between the seat pan and the underlying items. The seat pan assembly 10 of the present invention achieves both of these goals without adding additional material, elevating the entire seat foundation, and/or without compromising the size of the storage and utility area beneath the seat.

In particular, the aircraft seat pan assembly 10 of the present invention includes primarily a seat panel 20, which is preferably formed of strong, yet lightweight sheet of material such as steel or aluminum. The seat panel 20 includes primarily a primary surface 22, a pair of opposite side edges 24 and 26, a front edge 28, and a rear edge 30. These various edges are specifically structured to be secured to the side rail supports 72 and 73 and cross supports 74 and 75 of the seat foundation 70 so as to provide the seat pan assembly atop which a seat cushion is disposed and on which an individual sitting in the aircraft seat is actually supported.

As illustrated in FIG. 1, the front edge 28 of the seat panel 20 is secured directly to a front one of the cross supports 74, in generally planar relation thereto. Preferably, this front 28 is secured through a plurality of conventional bolts or rivets 60 or like fasteners to the front cross support 74. Similarly, the side edges 24 and 26 are secured directly to an upper surface of the side rail supports 72 and 73, in generally planar relation thereto, such as by a plurality of bolts or rivets 60 or like fasteners. Further, the side edges 24' and 26' of seat panel 20, as viewed in FIG. 2, may be coplanar with the primary surface 22 of the seat panel 20. In an alternative preferred embodiment, however, and depending upon the dimension of the side rail supports 72 and 73 and so as to further provide for a minimal stroking distance for the seat pan assembly 10, the seat panel 20 may include a pair of generally upwardly angled side panel segments 25 and 27, as illustrated in FIG. 1, which terminate in the opposing side edges 24 and 26 that are secured to the side rail supports 72 and 73. Of course, it will be appreciated that the front edge 28 of the seat panel 20 can also be formed to include a generally upwardly angled segment, (not shown in the drawings yet similar in configuration to those of segments 25 and 27), which segment can then be secured directly to a front one of the cross supports.

Turning to the rear edge 30 of the seat panel 20, it will preferably be secured by rear fastening means to a rear one of the cross supports 75 in a generally elevated, spaced apart position above the rear cross support. The rear fastening means are specifically structured to absorb a quantity of a downward spine load exerted on the seat panel 20. Accordingly, the seat panel 20 will be able to resist the downward spine load thereon, to a satisfaction of the FAA guidelines which do not permit contact between the primary surface 22 of the seat panel 20 and any underlying seat frame portions, while maintaining a minimal initial stroking distance between the primary surface 22 of the seat panel 20 and the underlying seat frame portions.

In the preferred embodiment, the rear fastening means will include a rear panel segment 32 which extends angularly upward from the primary surface 22 of the seat panel 20 and terminates in the rear edge 30 of the seat panel 20. Further, the rear edge 30 of the seat panel 20 will also preferably include a downwardly depending flange 35.

Secured to the downwardly depending flange 35, and included as part of the rear fastening means, is preferably a fastener clip 50. The fastener clip 50, as illustrated in FIGS. 1 and 4, includes primarily a rear panel 51 and a front panel 54. The rear panel 51 and front panel 54 are preferably formed of a single material panel, but nevertheless are secured with one another along a corresponding top edge 52 therebetween. These rear and front panels 51 and 54 extend along an entire length of the rear edge 30 of the seat panel 20 and are structured to engage the rear cross support 75. Specifically, the front panel 54 of the fastener clip 50 includes an upper segment 55 disposed in close, substantially parallel relation with the rear panel 51. Further, the front panel 54 includes a mid-segment 56 which extends from the upper segment 55 of the front panel 54 in a generally perpendicular relation to the rear panel 51. Preferably, the mid-segment 56 of the front panel 54 will have a length that is substantially equivalent to a diameter of the rear cross support 75 of the seat foundation 70. Finally, the front panel 54 includes a lower segment 57 that extends downwardly from the mid-segment 56 in substantially parallel, spaced relation from the rear panel 51. As such, the rear panel 51 and the lower segment 57 of the front panel 54 are structured to captivate the rear cross support 75 therebetween for secure connection therewith. This secure connection may be in any of a variety of forms, such as through the use of clips, welds or other fasteners, but in the preferred embodiment includes a series of screws or bolts 59 which extend through the fastener clip 50 and the rear cross support 75. Additionally, the fastener clip 50 will preferably include a plurality apertures 58 extending through the rear panel 51 and the upper segment 55 of the front panel 54 so as to facilitate securing of the downwardly depending flange 35 of the rear edge 30 thereto. In the preferred embodiment, the downwardly depending flange 35 of the rear edge 30 will be secured to the fastener clip 50 in overlying relation so as to abut the rear panel 51. Nevertheless, the flange 35 may be secured in abutting relation to the upper segment 55 of the front panel 54, and therefore may also rest on the mid-segment 56 of the front panel 54. Regardless of the positioning, much like the remaining portions of the seat pan assembly, any of a variety of fastener or securing methods may be implemented to secure the rear edge 30 to the fastener clip 50, however, a plurality of bolts, screw or rivets is preferred. As such, upon secure engagement of the rear edge 30 of the seat panel 20 to the rear cross support 75, the rear edge 30 is held in a generally elevated position above the rear cross support. Additionally, as a downward spine load is exerted on the primary surface 22 of the seat panel 20, a substantial quantity of that downward spine load is translated into the fastener clip 50 which provides reinforcement and absorbs and dissipates the load to reduce the amount of sagging experienced by the seat panel 20. The fastener clip 50 may therefore be constructed of a stronger material than a remainder of the seat pan assembly 10, however, it is the specific structure and configuration of the fastener clip 50 which absorbs the downward spine load. The absorption of the load will cause the clip 50 to generally flex, to a certain extent, so as to dissipate that load and enable the initial stroking distance between the primary surface 22 of the seat panel 20 and any underlying seat frame portions to be maintained at a substantial minimum. As such, the downward spine load is spread out over the frame and fastener clip prior to its substantially affecting the primary surface 22 of the seat panel 20 to result in a substantial sagging.

While this invention has been shown and described in what is considered to be a practical and preferred embodiment, it is recognized that departures may be made within the spirit and scope of this invention which should, therefore, not be limited except as set forth in the claims which follow and within the doctrine of equivalents.

Now that the invention has been described,

What is claimed is:

1. To be mounted on an aircraft seat foundation including a pair of spaced side rail supports and front and rear cross supports disposed in spanning, spaced apart relation between the side rail supports, an aircraft seat pan assembly comprising:

a seat panel, said seat panel including a primary surface, a pair of opposite side edges, a rear edge, and a front edge, said side edges being structured and disposed to be directly secured to an upper surface of the side rail supports, in generally planar relation thereto, said front edge of said seat panel being adapted for securement directly to a front one of the cross supports in generally planar relation thereto, rear fastening means structured and disposed to secure said rear edge of said seat panel to a rear one of the cross supports in a generally elevated, spaced apart position above the rear cross support and to absorb a quantity of a downward spine load exerted on said seat panel, such that said seat panel resists the downward spine load thereon with a minimal initial stroking distance between said primary surface of said seat panel and any underlying seat frame portions, said rear fastening means including a rear panel segment extending angularly upward from said primary surface of said seat panel and terminating in said rear edge of said seat panel, and said rear fastening means further including a fastener clip coupled to said rear edge of said seat panel and adapted for coupling to the rear cross support so as to maintain said rear edge of said seat panel in said elevated, spaced apart position above the rear cross support and to absorb the quantity of downward spine load.

2. An aircraft seat pan assembly as recited in claim 1 wherein said seat panel is formed of a generally lightweight, yet strong metal.

3. An aircraft seat pan assembly as recited in claim 1 wherein said fastener clip comprises:

a rear panel and a front panel, said rear panel and said front panel being secured with one another along corresponding top edges thereof, said front panel including an upper segment disposed in close, substantially parallel relation with said rear panel, said front panel further including a mid segment extending from said upper segment in substantially perpendicular relation to said rear panel, said mid segment having a length which is substantially equivalent to a diameter of the rear cross support of the seat frame, said front panel also including a lower segment extending downwardly from said mid segment in substantially parallel, spaced relation from said rear panel, and said rear panel and said lower segment of said front panel being structured to captivate the rear cross support therebetween for secure connection therewith, said rear edge of said seat panel including a downwardly depending flange, said downwardly depending flange of said rear edge of said seat panel being secured to said fastener clip such that said downward spine load exerted on said primary surface of said seat panel is translated into said fastener clip, said fastener clip being structured and disposed to absorb said quantity of said downward spine load so as to limit a distance which said primary surface of said seat panel sags downwardly under said load.

4. An aircraft seat pan assembly as recited in claim 1 wherein said seat panel includes a pair of generally upwardly angled side panel segments terminating in said opposing side edges such that said opposing side edges are securable to the side rail supports and said primary surface of said seat panel is disposed to minimize said initial stroking distance between said primary surface of said seat panel and any underlying seat frame portions.

5. An aircraft seat pan assembly as recited in claim 1 wherein said rear fastening means includes a fastener clip secured to said rear edge of said seat panel, said fastener clip comprising:

a rear panel and a front panel, said rear panel and said front panel being secured with one another along corresponding top edges thereof, said front panel including an upper segment disposed in close, substantially parallel relation with said rear panel, said front panel further including a mid segment extending from said upper segment in substantially perpendicular relation to said rear panel, said mid segment having a length which is substantially equivalent to a diameter of the rear cross support of the aircraft seat foundation, said front panel also including a lower segment extending downwardly from said mid segment in substantially parallel, spaced relation from said rear panel, and said rear panel and said lower segment of said front panel being structured to captivate the rear cross support therebetween for secure connection therewith, and said rear edge of said seat panel being secured to said fastener clip such that said downward spine load exerted on said primary surface of said seat panel is translated into said fastener clip, said fastener clip being structured and disposed to absorb said quantity of said downward spine load so as to limit a distance which said primary surface of said seat panel sags downwardly under said load.

\* \* \* \* \*